United States Patent
Miyata

(10) Patent No.: US 8,027,788 B2
(45) Date of Patent: Sep. 27, 2011

(54) NAVIGATION DEVICE AND EVALUATION VALUE SETTING METHOD

(75) Inventor: Hiromasa Miyata, Tokyo (JP)

(73) Assignee: Sony Corporation, Tokyo (JP)

( * ) Notice: Subject to any disclaimer, the term of this patent is extended or adjusted under 35 U.S.C. 154(b) by 741 days.

(21) Appl. No.: 12/105,619

(22) Filed: Apr. 18, 2008

(65) Prior Publication Data

US 2008/0281519 A1  Nov. 13, 2008

(30) Foreign Application Priority Data

May 11, 2007 (JP) ................. 2007-127119

(51) Int. Cl.
*G01C 21/00* (2006.01)

(52) U.S. Cl. ........ 701/213; 701/207; 701/211; 701/214; 340/988; 340/995.17

(58) Field of Classification Search .................. 701/207, 701/209, 210, 211–214, 300; 340/988, 995.17, 340/995.19, 995.23, 995.28
See application file for complete search history.

(56) References Cited

U.S. PATENT DOCUMENTS

2006/0241858 A1 * 10/2006 Adachi .................. 701/207

FOREIGN PATENT DOCUMENTS

| JP | 10-339647 | 12/1998 |
| JP | 11-132774 | 5/1999 |
| JP | 2005-149481 | 6/2005 |
| JP | 2005-214779 | 8/2005 |
| JP | 2007-11161 | 1/2007 |

* cited by examiner

*Primary Examiner* — Gertrude Arthur Jeanglaude
(74) *Attorney, Agent, or Firm* — Oblon, Spivak, McClelland, Maier & Neustadt, L.L.P.

(57) ABSTRACT

The present invention provides a navigation device that improves the usability. The navigation device includes an evaluation setting unit that generates position information having first evaluation value by setting an evaluation value selected by a user so that the evaluation value corresponds to position information, a position information extraction unit that extracts, of the position information having the first evaluation value, the position information having the first evaluation value corresponding to the evaluation value desired by the user, and a display control unit that displays a position information screen having evaluation value on which the position information having the first evaluation value extracted by the position information extraction unit is reflected on a display unit.

19 Claims, 12 Drawing Sheets

NAVIGATION DEVICE AND EVALUATION VALUE SETTING METHOD

CROSS REFERENCES TO RELATED APPLICATIONS

The present invention contains subject matter related to Japanese Patent Application JP2007-127119 filed in the Japanese Patent Office on May 11, 2007, the entire contents of which being incorporated herein by reference.

BACKGROUND OF THE INVENTION

1. Field of the Invention

The present invention relates to a navigation device and an evaluation value setting method, which are desirably applied to a portable type navigation device referred to as, for example, Personal Navigation Device (referred to as PND, hereinafter).

2. Description of the Related Art

In the PND, for example, a Point of Interest (POI) as position information prepared by the manufacturer side previously such as a restaurant or a resort facility is made to correspond to map data, and is registered in an embedded memory.

In the PND, for example, as shown in FIG. 1, when a map screen G based on map data is displayed on a monitor, multiple landmarks R corresponding to the POIs are arranged on the map screen G (For example, refer to Jpn. Pat. Appln. Laid-Open Publication No. 2004-69438).

SUMMARY OF THE INVENTION

Meanwhile, in the conventional PND, when the POIs registered in the PND increase, the landmarks R arranged on the map screen G increase, and there is raised a problem that the display contents of the map screen G becomes complicated.

Furthermore, in the conventional PND, when the map screen G is displayed on a monitor, the POIs in a range represented by the map screen G are read out from an embedded memory, and the landmarks R corresponding to the POIs are simply arranged on the map screen G. Accordingly, since the landmarks R corresponding to the POIs desired by the user are not sorted to be arranged, the PND is not necessarily easily used by the user.

In view of the above-identified circumstances, it is therefore desirable to provide a navigation device and an evaluation value setting method, which can improve the usability.

According to an embodiment of the present invention, there is provided a navigation device which generates position information having first evaluation value by setting an evaluation value selected by a user so that the evaluation value corresponds to position information, extracts, of the position information having the first evaluation value, the position information having the first evaluation value corresponding to the evaluation value desired by the user, and displays a position information screen having evaluation value on which the extracted position information having the first evaluation value is reflected on a display means. Accordingly, without complicating the position information screen having evaluation value by reflecting all the position information having the first evaluation value on the position information screen having evaluation value, only the position information having the first evaluation value of an evaluation value desired by the user can be surely supplied to the user. As a result, the position information screen having evaluation value to be displayed on the display means can be visually confirmed easily by the user.

Accordingly, it becomes possible to realize a navigation device and an evaluation value setting method, which can improve the usability.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, an embodiment of the present invention will be described in greater detail by referring to the accompanying drawings.

(1) Exterior Configuration of PND

Figure 1:
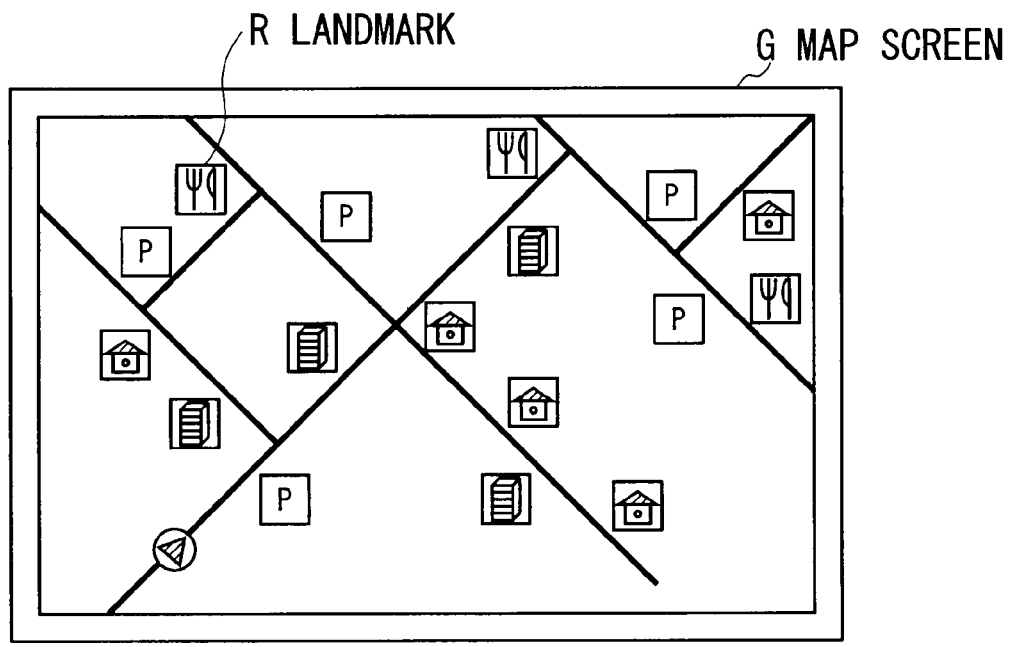
FIG. 1 shows a schematic view indicative of the state of displaying a map screen in the conventional PND.
Figure 2:
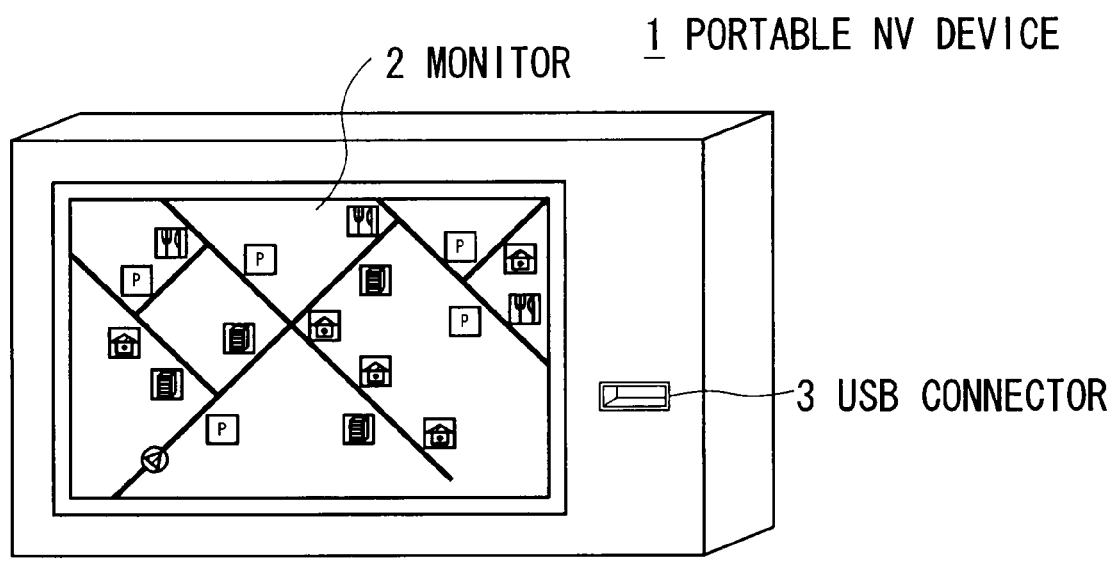
FIG. 2 shows a schematic view indicative of the exterior configuration of a PND in this embodiment.
Figure 3:
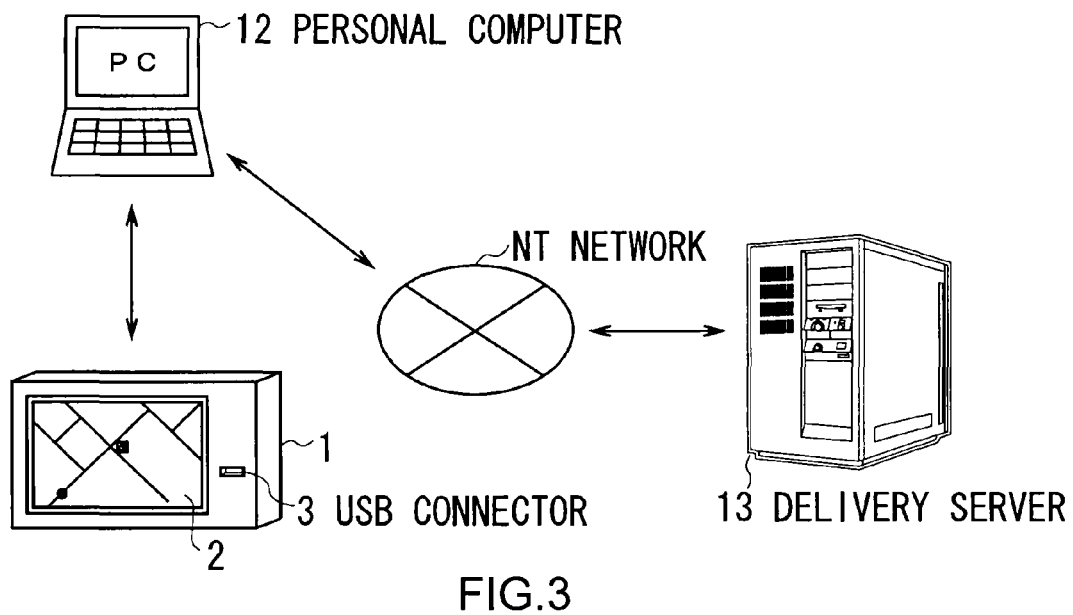
FIG. 3 shows a schematic view indicative of the state of transferring information to the PND.

Referring to FIG. 2 and FIG. 3, a reference numeral "1" represents a portable type PND which can be carried out and is used mainly in a vehicle, and a monitor 2 is arranged on the front surface thereof, and a map screen etc. based on map data stored in an embedded memory is displayed on the monitor 2.

On the PND 1, a Universal Serial Bus (USB) connector 3 is arranged at the right side of the monitor 2, and a USB cable (not shown) is connected thereto. When recognizing that a USB cable is connected to the USB connector 3, and the PND 1 is connected to a personal computer 12, according to the user operation, the PND 1 transfers a POI with user rate (to be described later) stored in the embedded memory to the personal computer 12 through the USB cable.

In the POI with user rate, user rate information as an evaluation value of the user is appended to an arbitrary POI registered in the PND 1 previously, and details of which will be explained later.

(2) Transfer of Rate Information

When the personal computer 12 is connected to the PND 1 through a USB cable, the personal computer 12 receives the POI with user rate transferred from the PND 1. Then the personal computer 12 transmits the POI with user rate to a delivery server 13 through a network NT.

When receiving the POI with user rate transmitted from the personal computer 12 or other personal computers (not shown) (that is, plural users), the delivery server 13 adds up user rate information appended to the POI with user rate received from the plural users, and calculates the average value thereof as rate information by mouth-to-mouth advertising (MMA). Then, the delivery server 13 appends thus generated MMA rate information to a POI corresponding to the MMA rate information to generate a POI with MMA rate.

The delivery server 13 has stored thus generated plural POIs with MMA rate in the embedded memory previously, and, when receiving the POI with user rate from the personal computer 12 or other personal computers (not shown), the delivery server 13 returns (that is, delivers) the plural POIs with MMA rate stored in the embedded memory at the time to the personal computer 12 or other personal computers (not shown).

When the personal computer 12 transmits the POI with user rate to the delivery server 13, and receives the plural POIs with MMA rate delivered from the delivery server 13, the personal computer 12 transfers the POIs with MMA rate to the PND 1 through the USB cable.

In this way, the PND 1 transfers the POI with user rate to the personal computer 12 through the USB cable, and receives the plural POIs with MMA rate transferred from the personal computer 12.

(3) Circuit Configuration of PND

Figure 4:
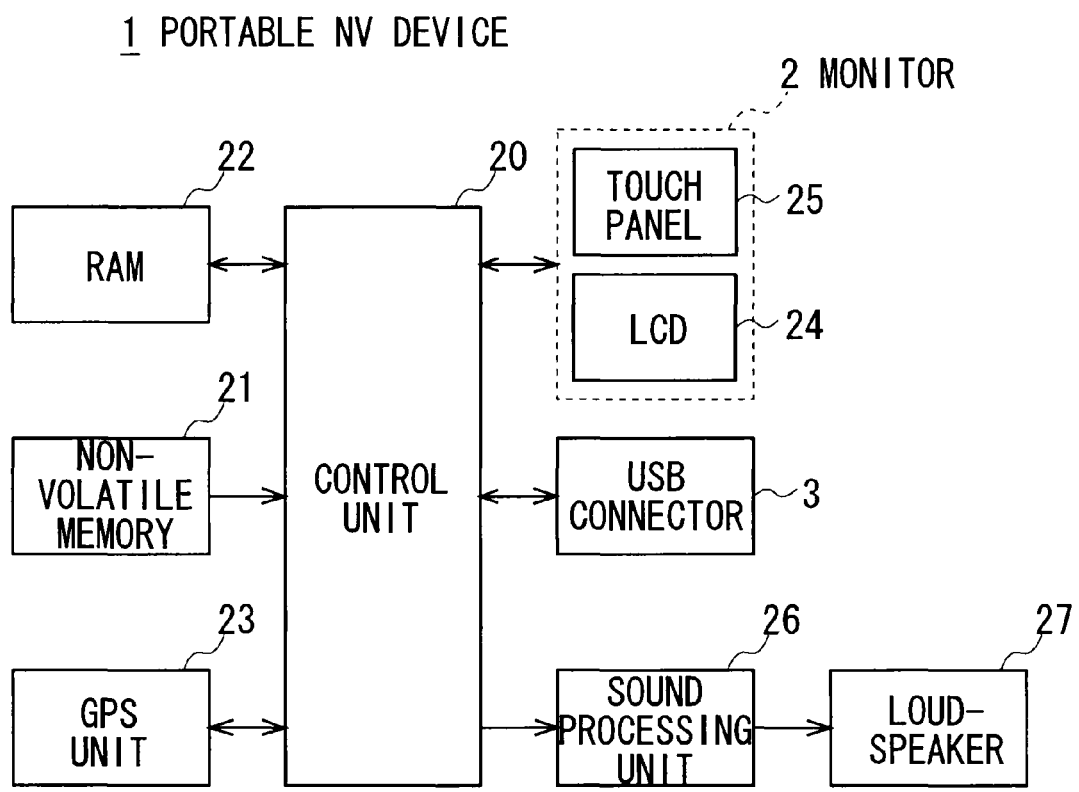
FIG. 4 shows a schematic view indicative of the circuit configuration of the PND in this embodiment.

As shown in FIG. 4, in the PND 1, a control unit 20 configured by a Central Processing Unit (CPU) controls the entire units, and reads out a basic program and an application program stored in a nonvolatile memory 21 to execute the basic program and application program on a Random Access Memory (RAM) 22. Thus, general navigation function, rate setting function and display function for respective rates to be described later can be realized.

In the nonvolatile memory 21 of the PND 1, map data of all parts of the country is stored. Furthermore, in the nonvolatile memory 21, the POI has been registered previously so that the POI corresponds to a position on the map represented by the map data.

A Global Positioning System (GPS) unit 23 of the PND 1 is so configured as to calculate the GPS information configured by the latitude, longitude, altitude, etc., all the time by receiving an electric wave from a GPS satellite, and sends thus obtained GPS information to the control unit 20.

By comparing the GPS information sent from the GPS unit 23 and the map data stored in the nonvolatile memory 21, the control unit 20 reads out map data representing a map of a predetermined range including the current position of the PND 1 (that is, vehicle position where a vehicle to which the PND 1 is loaded exists) from the nonvolatile memory 21.

Figure 5:
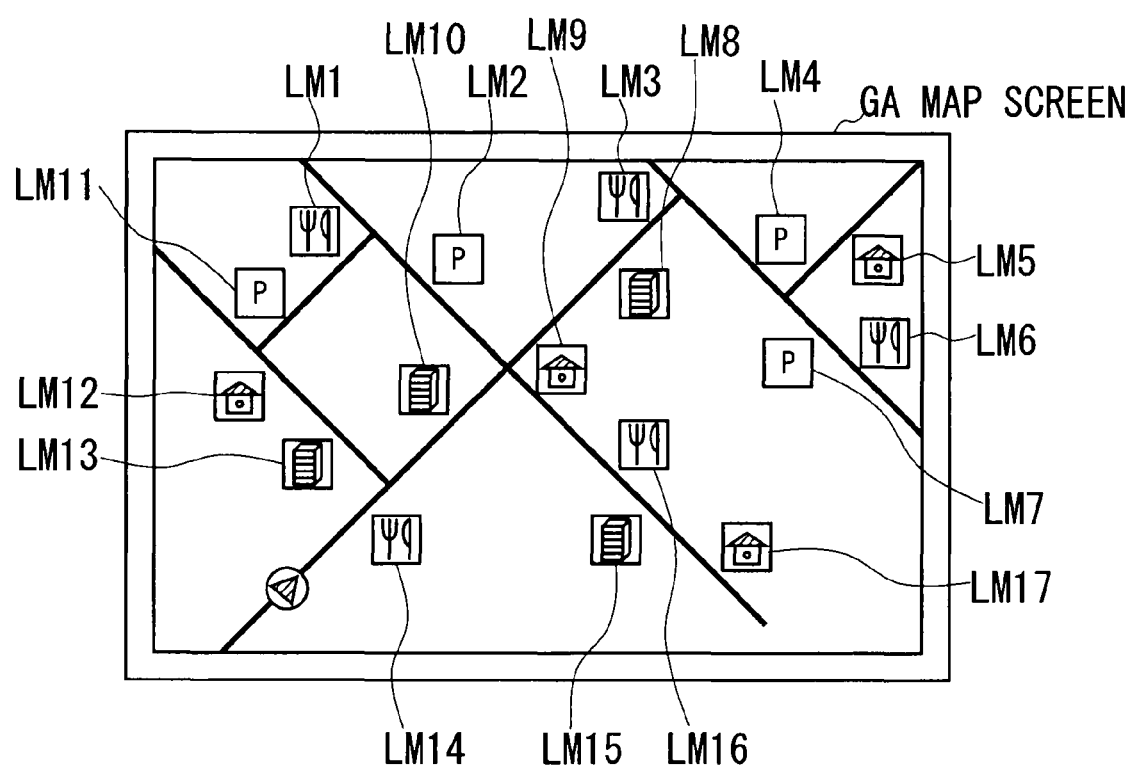
FIG. 5 shows a schematic view indicative of the state of displaying a map screen in this embodiment.

Then, as shown in FIG. 5, the control unit 20 displays a map screen GA based on the map data on a Liquid Crystal Display (LCD) 24 of the monitor 2, and arranges landmarks LM (In this case, LM1, LM2, LM3, . . . LM17) corresponding to the POIs in a range which the map screen GA represents on corresponding positions on the map screen GA.

Then, according to the user operation corresponding to a touch panel 25 arranged on the surface of the LCD 24 of the monitor 2, when any one of the landmarks LM (POIs) is arbitrarily selected as the destination (hereinafter, thus selected POI is referred to as destination POI), the control unit 20 calculates the accession route, arrival predicted time, etc. to the destination corresponding to the destination POI from the vehicle position, and the map screen GA on which the accession route, arrival predicted time, etc. are arranged is displayed on the LCD 24.

At this time, when control unit 20 controls a sound processing unit 26, while the vehicle driven by the user is traveling to the destination along the accession route, the sound processing unit 26 generates sound information to guide and aid the driving of the vehicle (referred to as navigate collectively, hereinafter), and outputs a navigate sound based on the sound information from a loudspeaker 27.

In this way, the PND 1 is so configured as to provide the navigation function to navigate the vehicle to the destination desired by the user.

(4) Rate Setting Function

Next, the rate setting function under which the user sets the rate for the POI which has been registered in the PND 1 previously will be explained.

Figure 6:
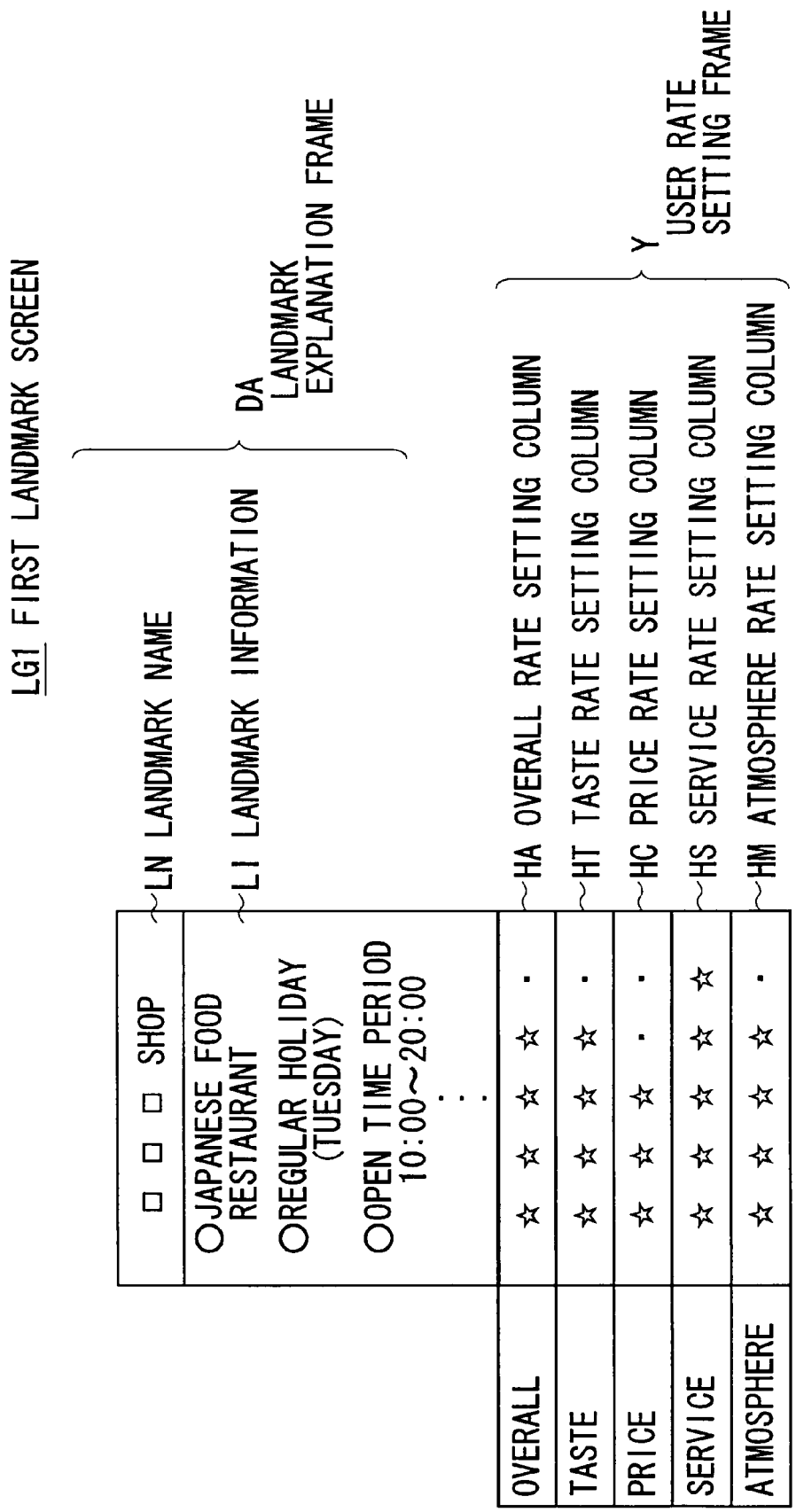
FIG. 6 shows a schematic view indicative of the state of a first landmark screen.

Firstly, when executing the above-described navigation function, in a state in which the map screen GA (FIG. 5) on which a plurality of landmarks LM (LM1, LM2, LM3, . . . LM17) are arranged is displayed on the LCD 24, when recognizing that an arbitrary landmark LM (in this case, for example, LM1) is selected according to the user operation with respect to the touch panel 25, as shown in FIG. 6, the control unit 20 displays a first landmark screen LG1 indicative of information of the landmark LM1 on the LCD 24.

The control unit 20 displays a landmark explanation frame DA on the upper part of the first landmark screen LG1, and displays a user rate setting frame Y on the lower part of the first landmark screen LG1.

The control unit 20 displays a landmark name LN corresponding to the landmark LM (in this case, LM1) on the upper part of the landmark explanation frame DA, and represents information (referred to as landmark information) LI such as the genre, regular holiday, open time period of the landmark LM (in this case, for example, Japanese food restaurant) under the landmark name LN. In this way, the control unit 20 makes the user visually confirm the landmark name LN and landmark information LI of the landmark LM1 selected according to the user operation with respect to the touch panel 25.

In addition, the user rate setting frame Y of the first landmark screen LG1 is formed by respective items of, for example, an overall rate setting column HA, a taste rate setting column HT, a price rate setting column HC, a service rate setting column HS, and an atmosphere rate setting column HM. According to the user operation with respect to the touch panel 25, the control unit 20 sets the user rate (in this case, taste rate, price rate, service rate, and atmosphere rate) in the taste rate setting column HT, price rate setting column HC, service rate setting column HS, and atmosphere rate setting column HM to five stages.

Then, by averaging the taste rate, price rate, service rate, and atmosphere rate set in the taste rate setting column HT, price rate setting column HC, service rate setting column HS, and atmosphere rate setting column HM respectively, the control unit 20 calculates an overall rate and displays the overall rate in the overall rate setting column HA.

Specifically, according to the user operation with respect to the touch panel 25, for example, in case "☆×4" is set as the taste rate of "4" of the five-stage evaluation for the taste rate setting column HT, "☆×3" is set as the price rate of "3" of the five-stage evaluation for the price rate setting column HC, "☆×5" is set as the service rate of "5" of the five-stage evaluation for the service rate setting column HS, and "☆×4" is set as the atmosphere rate of "4" of the five-stage evaluation for the atmosphere rate setting column HM, the control unit 20 calculates "☆×4" as the overall rate of "4" of the five-stage evaluation for the overall rate setting column HA in the manner of "(4+3+5+4)/4"="4"

Then, by collecting up the taste rate, price rate, service rate, atmosphere rate set according to the user operation with respect to the touch panel 25, and overall rate which is calculated by averaging the taste rate, price rate, service rate, and atmosphere rate, the control unit 20 generates the user rate information.

In this way, for example, based on information which the user obtains from a visit destination such as Japanese food restaurant, by generating the user rate information so that the user rate information corresponds to the landmark LM (that is POI) corresponding to the visit destination and appends the user rate information, the control unit 20 can generate the POI with user rate.

Then, according to the user operation with respect to the touch panel 25, when recognizing that the landmark LM corresponding to the POI with user rate is selected, by displaying the first landmark screen LG1 (FIG. 6) corresponding to the landmark LM on the LCD 24, the control unit 20 can make the user visually confirm the user rate information displayed in the overall rate setting column HA, taste rate setting column HT, price rate setting column HC, service rate setting column HS, and atmosphere rate setting column HM of the user rate setting frame Y. As a result, as compared with a case in which the user is made to visually confirm only the landmark name LN and landmark information LI, it becomes possible to provide the user with valuable information.

(5) Rate Setting Processing Procedure

Figure 7:
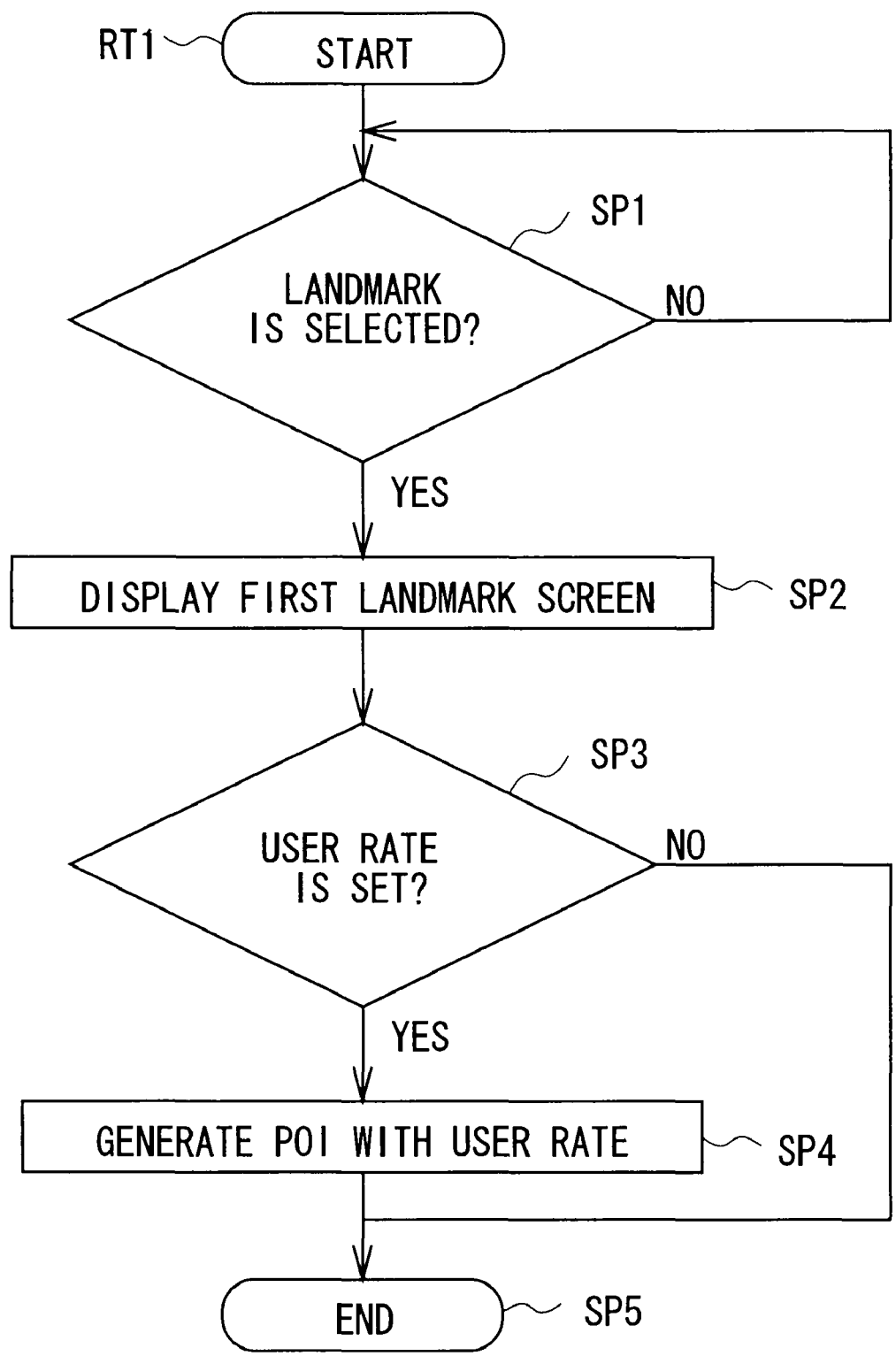
FIG. 7 shows a flowchart indicative of the rate setting processing procedure.

Next, the rate setting processing procedure in which the control unit 20 of the PND 1 sets the user rate for the landmark LM and generates the POI with user rate using the rate setting function based on the above-described application program will be specifically explained using a flowchart shown in FIG. 7.

Actually, in a state in which the map screen GA and the landmarks LM (LM1, LM2, LM3, . . . LM17) corresponding to the POIs in a range represented by the map screen GA are displayed on the LCD 24, the control unit 20 of the PND 1 starts the routine RT1 from the start step, and the processing goes to step SP1, and determines whether or not an arbitrary landmark LM is selected by the user.

In step SP1, in case a positive result is obtained, this indicates that, according to the user operation with respect to the touch panel 25, an arbitrary landmark LM on the map screen GA is selected, and the control unit 20 goes to the next step SP2.

On the other hand, in step SP1, in case a negative result is obtained, this indicates that none of the landmarks LM on the map screen GA is selected, and the control unit 20 waits for any one of the landmarks LM to be selected.

In step SP2, the control unit 20 displays the first landmark screen LG1 corresponding to the landmark LM selected by the user in step SP1 on the LCD 24, and the processing goes to step SP3.

In step SP3, the control unit 20 determines whether or not the user rate is set by the user. In step SP3, in case a positive result is obtained, this indicates that the user rate (in this case, the taste rate, price rate, service rate, and atmosphere rate) is input to the taste rate setting column HT, price rate setting column HC, service rate setting column HS, and atmosphere rate setting column HM of the user rate setting frame Y through the touch panel 25. At this time, the control unit 20 calculates the overall rate by averaging the taste rate, price rate, service rate, and atmosphere rate, and the processing goes to step SP4.

In step SP4, the control unit 20 generates the user rate information based on the taste rate, price rate, service rate, atmosphere rate input according to the user operation with respect to the touch panel 25, and overall rate calculated by averaging these taste rate, price rate, service rate, and atmosphere rate. Then, the control unit 20 generates the POI with user rate by making the user rate information correspond to the POI and appending the user rate information thereto, and the processing goes to next step SP5 to end the processing.

On the other hand, in step SP3, in case a negative result is obtained, this indicates that the landmark name LN and landmark information LI of the landmark LM, and user rate information are only visually confirmed by the user, and the taste rate, price rate, service rate, and atmosphere rate are not input to the taste rate setting column HT, price rate setting column HC, service rate setting column HS, and atmosphere rate setting column HM of the user rate setting frame Y, and the control unit 20 goes to next step SP5 to end the processing.

In this way, the control unit 20 of the PND 1 generates the POI with user rate by generating the user rate information so that the user rate information corresponds to an arbitrary landmark LM (POI) and appending the user rate information thereto.

(6) Display Function for Respective Rates

Next, display function for respective rates under which the control unit 20 of the PND 1 displays the map screen GA, in which the landmarks LM corresponding to the POI with user rate or POI with MMA rate are arranged, on the LCD 24 will be explained.

Firstly, when recognizing that a USB cable is connected to the USB connector 3, and the PND 1 is connected to the personal computer 12, as described above, the control unit 20 of the PND 1 transfers the POI with user rate to the personal computer 12, and receives the plural POIs with MMA rate transferred from the personal computer 12.

As described above, the MMA rate information calculated as the average value of the user rate information from the plural users for a single POI is added to the POIs with MMA rate.

Then, the control unit 20 makes the nonvolatile memory 21 stores the plural POIs with MMA rate obtained from the personal computer 12.

On the other hand, as a result of storing the POI with MMA rate in the nonvolatile memory 21, there is a case in which, for a single landmark LM, both the POI with user rate and POI with MMA rate are stored in the nonvolatile memory 21.

At this time, the control unit 20 gives priority to the POI with user rate generated when the user visits a position represented by the landmark LM over POI with MMA rate (that is, priority is given to the POI with user rate on which the interest and preference of the user is further reflected).

Accordingly, according to the user operation with respect to the touch panel 25, when recognizing that the landmark LM is selected, in case both the POI with user rate and POI with MMA rate corresponding to the landmark LM are stored in the nonvolatile memory 21, or only the POI with user rate corresponding to the landmark LM is stored in the nonvolatile memory 21, the control unit 20 displays the first landmark screen LG1 (FIG. 6) based on the POI with user rate on the LCD 24. In this way, the control unit 20 can surely provide the user with the user rate information of the POI with user rate on which the interest and preference of the user is further reflected.

Figure 8:
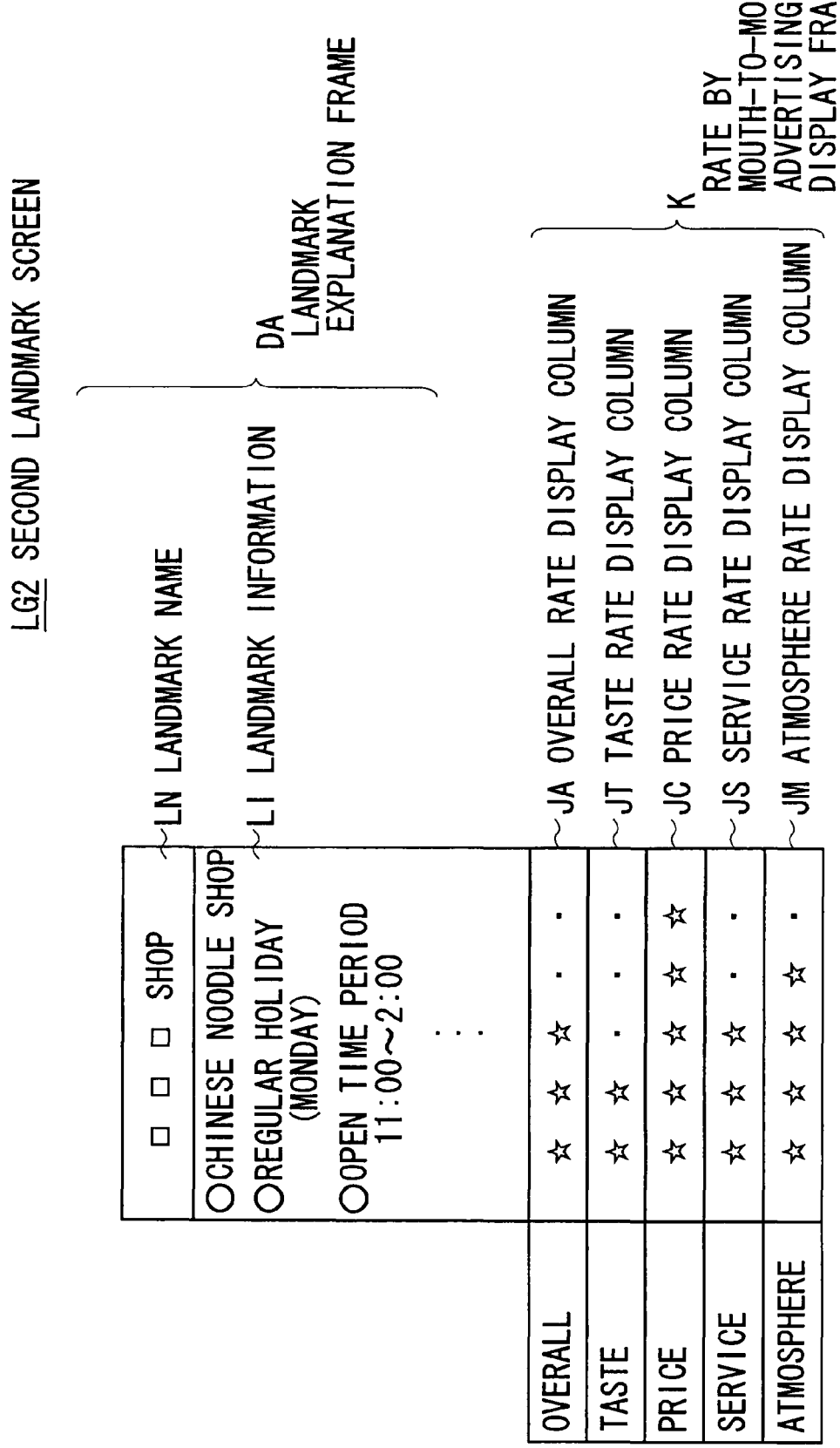
FIG. 8 shows a schematic view indicative of the state of a second landmark screen.

Furthermore, according to the user operation with respect to the touch panel 25, when recognizing that the landmark LM is selected, in case only the POI with MMA rate corresponding to the landmark LM is stored in the nonvolatile memory 21, as shown in FIG. 8, in which parts or components similar to those shown in FIG. 6 are indicated with the same reference numerals, the control unit 20 displays a second landmark screen LG2 based on the POI with MMA rate on the LCD 24.

The control unit 20 displays the above-described landmark explanation frame DA on the upper part of the second landmark screen LG2, and displays an MMA rate display frame K on the lower part of the second landmark screen LG2.

The MMA rate display frame K is formed by respective items of an overall rate display column JA, a taste rate display column JT, a price rate display column JC, a service rate display column JS, and an atmosphere rate display column JM. In the overall rate display column JA, taste rate display column JT, price rate display column JC, service rate display column JS, and atmosphere rate display column JM, the control unit 20 displays the MMA rate information (that is, overall rate, taste rate, price rate, service rate, and atmosphere rate) appended to the POI with MMA rate.

Specifically, when the second landmark screen LG2 (FIG. 8) is displayed on the LCD 24 according to the user operation with respect to the touch panel 25, the control unit 20 displays "☆×3" as the overall rate of "3" of the five-stage evaluation for the overall rate display column JA, displays "☆×2" as the taste rate of "2" of the five-stage evaluation for the taste rate display column JT, displays "☆×5" as the price rate of "5" of the five-stage evaluation for the price rate display column JC, displays "☆×2" as the service rate of "2" of the five-stage evaluation for the service rate display column JS, and displays "☆×4" as the atmosphere rate of "4" of the five-stage evaluation for the atmosphere rate display column JM.

In this way, when the landmark LM is selected according to the user operation with respect to the touch panel 25, in case the POI with user rate corresponding to the landmark LM is not stored in the nonvolatile memory 21 (that is, in case the user has not visited to a position represented by the landmark LM), the control unit 20 can provide the user with the MMA rate information of the POI with MMA rate which is the average evaluation of other users.

Figure 9:
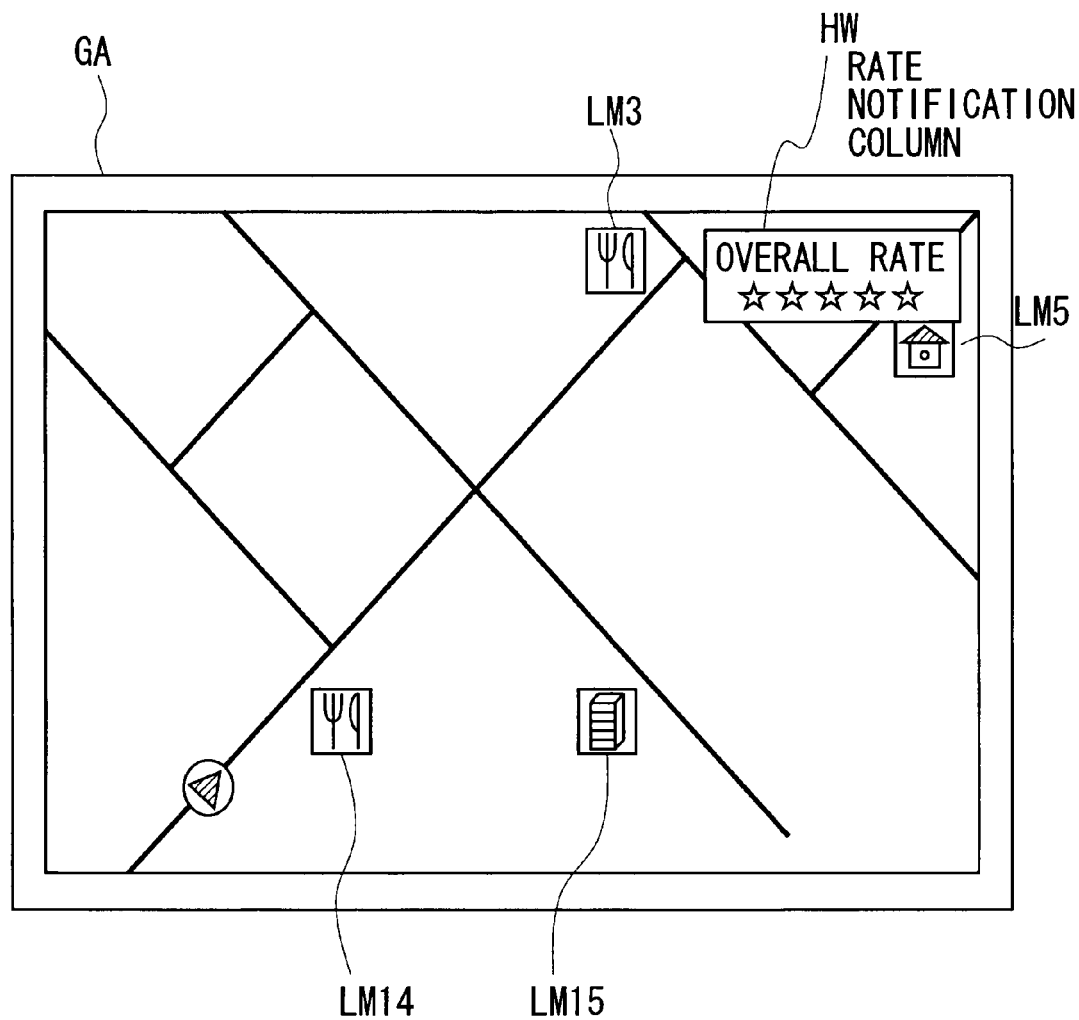
FIG. 9 shows a schematic view indicative of the state (1) of extracting landmarks by the overall rate.

When the above-described navigation function is executed, in a state in which the POI with user rate and POI with MMA rate are stored in the nonvolatile memory 21, for example, by the operation with respect to the touch panel 25 of the user who desires to know the landmarks LM corresponding to the POI with user rate and POI with MMA rate whose overall rate is high, when it is recognized that a display command for respective rates which extracts and displays only the landmarks LM corresponding to the POI with user rate and POI with MMA rate whose overall rate is "5" is input, as shown in FIG. 9, the control unit 20 displays the map screen GA in which, of the plural landmarks LM (LM1, LM2, LM3, ... LM17) on the map screen GA (FIG. 5), only the landmarks LM (in this case, LM3, LM5, LM14, and LM15) corresponding to the POI with user rate and POI with MMA rate for which "5" is set with respect to the overall rate are arranged on the LCD 24.

At this time, by displaying a rate notification column HW on the upper right of the map screen GA, the control unit 20 notifies the user of that based on what rate the landmarks LM (in this case, LM3, LM5, LM14, and LM15) arranged on the map screen GA at the present moment are arranged (in this case, the landmark LM whose overall rate is "5" is arranged).

In this way, for the user who desires to know the landmarks LM whose overall rate is high, the control unit 20 arranges only the landmarks LM (LM3, LM5, LM14, and LM15) whose overall rate is "5" on the map screen GA and makes the user visually confirm the landmarks LM. Accordingly, without complicating the map screen GA by arranging all the landmarks LM (LM1, LM2, LM3, ... LM17), the landmarks LM (LM3, LM5, LM14, and LM15) whose overall rate is "5" can be surely provided to the user. As a result, the user can visually confirm the map screen GA displayed on the LCD 24 easily.

Figure 10:
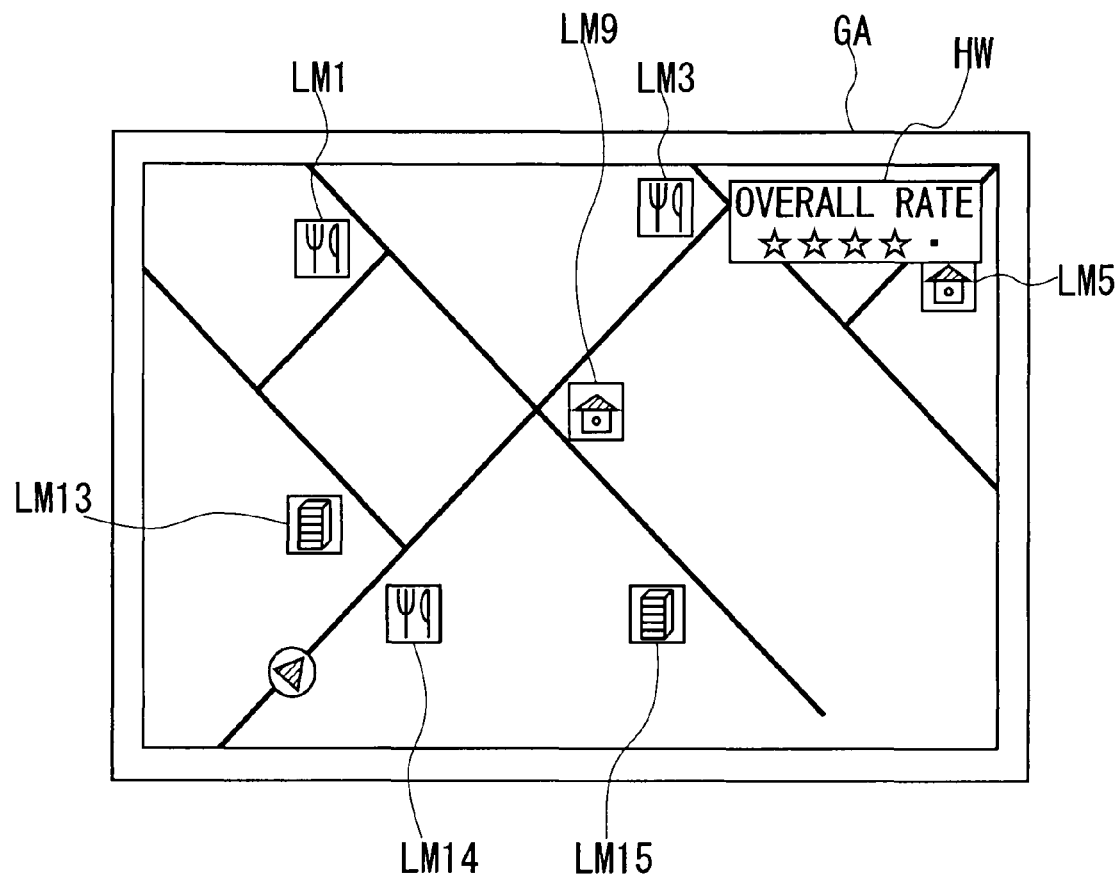
FIG. 10 shows a schematic view indicative of the state (2) of extracting landmarks by the overall rate.

While the map screen GA in which the landmarks LM corresponding to the POI with user rate and POI with MMA rate whose overall rate is "5" are arranged is displayed, by the operation with respect to the touch panel 25 of the user who is not bale to obtain necessary information since the number of the landmarks LM on the map screen GA is smaller than that the user expected, when it is recognized that a display command for respective rates which extracts and displays only the landmarks LM corresponding to the POI with user rate and POI with MMA rate whose overall rate is "4" or more (that is, "4" or "5") is input, as shown in FIG. 10, the control unit 20 displays the map screen GA in which, of the plural landmarks LM (LM1, LM2, LM3, ... LM17) on the map screen GA (FIG. 5), only the landmarks LM (in this case, LM1, LM3, LM5, LM9, LM13, LM14, and LM15) corresponding to the POI with user rate and POI with MMA rate for which "4" and "5" are set with respect to the overall rate are arranged on the LCD 24.

In this way, when the landmarks LM corresponding to the POI with user rate and POI with MMA rate whose overall rate is "5" are arranged on the map screen GA, for the user who is not able to obtain necessary information since the number of the landmarks LM on the map screen GA is smaller than that the user expected, the landmarks LM (LM1, LM9, and LM13) whose overall rate is "4", which is the second highest rate next to the overall rate "5", can also be arranged on the map screen GA. Thus, without complicating the map screen GA by uselessly arranging other landmarks LM whose overall rate is low, only the landmarks LM which are desired by the user can be arranged on the map screen GA.

Figure 11:
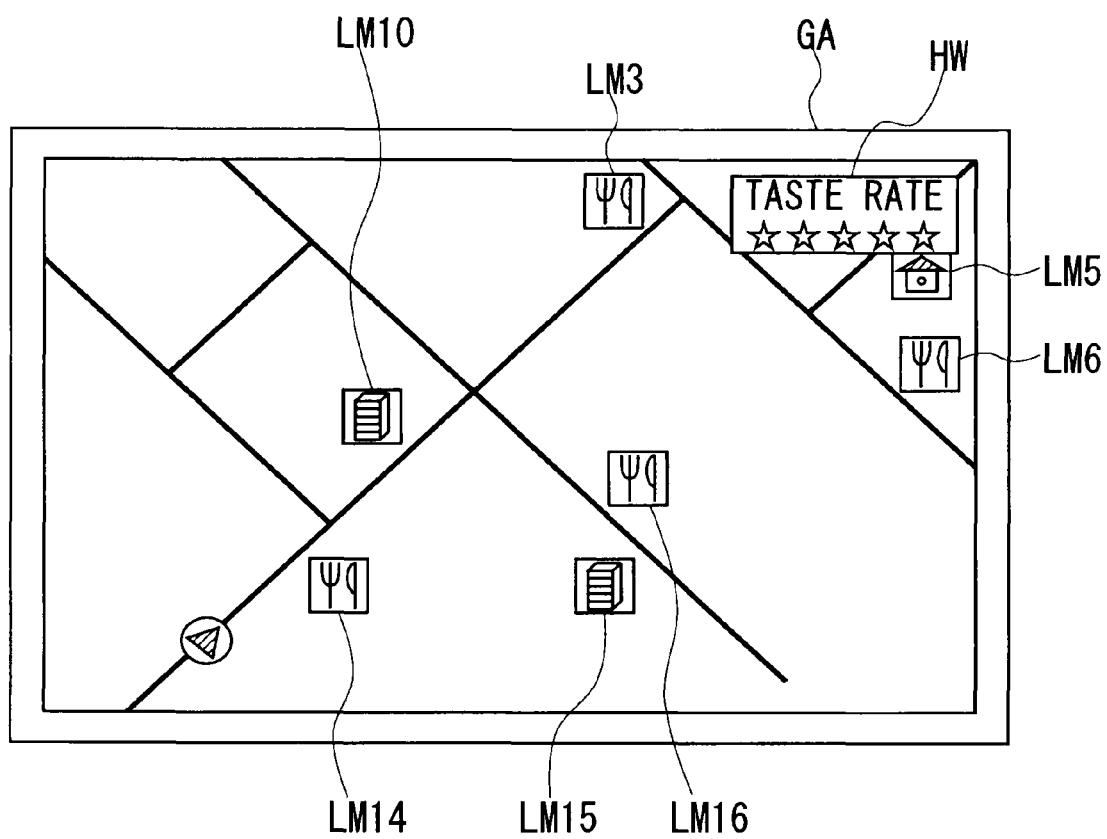
FIG. 11 shows a schematic view indicative of the state of extracting landmarks by the taste rate.

On the other hand, for example, irrespective of the price and atmosphere, by the operation with respect to the touch panel 25 of the user who desires to eat delicious food, when recognizing that a display command for respective rates which extracts and displays only the landmarks LM corresponding to the POI with user rate and POI with MMA rate whose taste rate is "5" is input, as shown in FIG. 11, the control unit 20 displays the map screen GA in which, of the plural landmarks LM (LM1, LM2, LM3, ... LM17) on the map screen GA (FIG. 5), only the landmarks LM (in this case, LM3, LM5, LM6, LM10, LM14, LM15, and LM16) corresponding to the POI with user rate and POI with MMA rate for which "5" is set with respect to the taste rate are arranged on the LCD 24.

In this way, for the demand according to the situation of the user, the control unit 20 can extract the landmarks LM and arrange thus extracted landmarks LM on the map screen GA according to other rates (in this case, taste rate, price rate, service rate, atmosphere rate, etc.) other than the overall rate, which can provide information according to detailed demand of the user.

Figure 12:
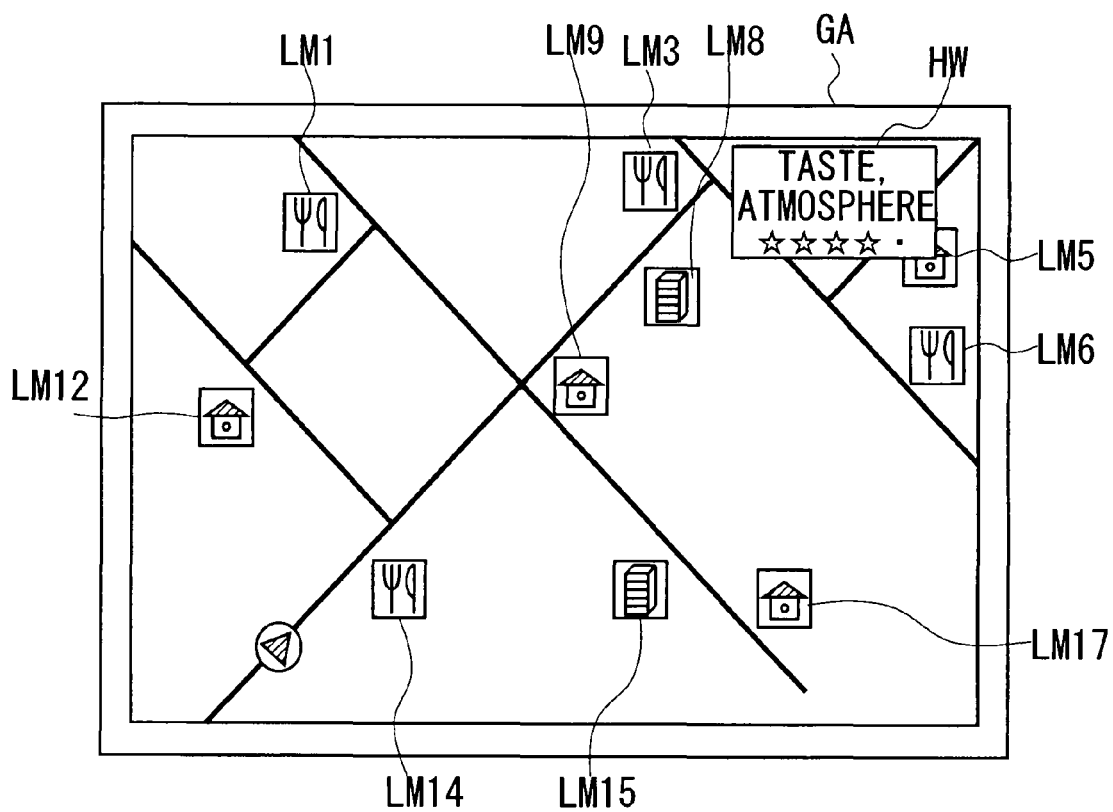
FIG. 12 shows a schematic view indicative of the state of extracting landmarks by the combined average rate.

Furthermore, for example, during a date with a lover, by the operation with respect to the touch panel 25 of the user who desires to know a restaurant where they can eat delicious food and the atmosphere is good, when recognizing that a display command for respective rates which extracts and displays only the landmarks LM corresponding to the POI with user rate and POI with MMA rate whose combined average rate, which is configured by the average value of two rates or the taste rate and atmosphere rate and is "4" or more, is input, as shown in FIG. 12, the control unit 20 displays the map screen GA in which, of the plural landmarks LM (LM1, LM2, LM3, ... LM17) on the map screen GA (FIG. 5), only the landmarks LM (in this case, LM1, LM3, LM5, LM6, LM8, LM9, LM12, LM14, LM15, and LM17) corresponding to the POI with user rate and POI with MMA rate for which "4" or more is set with respect to the combined average rate which is configured by the average value of the taste rate and atmosphere rate are arranged on the LCD 24.

In this way, for the demand according to the situation of the user, the control unit 20 can extract the landmarks LM and display thus extracted landmarks LM on the map screen GA according to the combined average rate, which is obtained by combining and averaging not only the overall rate and respective rates (in this case, taste rate, price rate, service rate, and atmosphere rate) to calculate the overall rate but also parts of the respective rates, which can further improve the usability according to detailed demand of the user.

In this way, of the plural landmarks LM (LM1, LM2, LM3, ... LM17), the control unit 20 of the PND 1 extracts landmarks LM corresponding to the rate desired by the user, and displays the map screen GA in which the landmarks LM are arranged on the LCD 24. Accordingly, without complicating the map screen GA by arranging all the landmarks LM (LM1, LM2, LM3, ... LM17), only the landmarks LM of the rate desired by the user can be extracted to be surely provided to the user. As a result, the user can visually confirm the map screen GA displayed on the LCD 24 easily, which can improve the usability.

Furthermore, in this case, of the plural landmarks LM (LM1, LM2, LM3, ... LM17), the control unit 20 extracts the landmark LM corresponding to the rate desired by the user. Accordingly, it becomes possible to provide only the optimum landmarks LM desired by the user, which can improve the usability.

(7) Display Processing Procedure for Respective Rates

Figure 13:
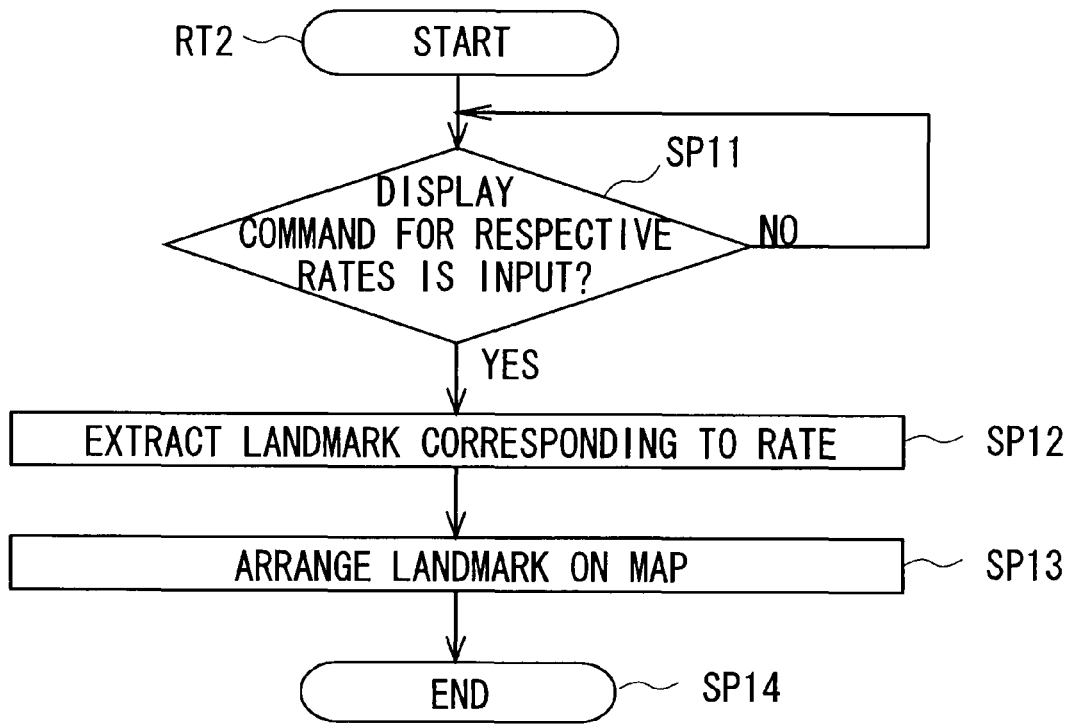
FIG. 13 shows a flowchart indicative of the display processing procedure for respective rates.

Next, the display processing procedure for respective rates in which the control unit 20 of the PND 1 uses the display function for respective rates based on the above-described application program, extracts the landmarks LM corresponding to the rate desired by the user to arrange thus extracted landmarks LM on the map screen GA, and displays the map screen GA on the LCD 24 will be explained using a flowchart shown in FIG. 13.

Actually, the control unit 20 of the PND 1 starts the routine RT2 from the start step, and the processing goes to step SP11, and determines whether or not a display command for respective rates to extract and display the landmarks LM corresponding to a predetermined rate is input through the touch panel 25.

In step SP11, in case a positive result is obtained, this indicates that the user desires the landmarks LM corresponding to a predetermined rate to be extracted and displayed, and the control unit 20 goes to the next step SP12.

On the other hand, in step SP11, in case a negative result is obtained, this indicates that the user does not desire the landmarks LM corresponding to a predetermined rate to be extracted and displayed, and the control unit 20 waits for a display command for respective rates to be input.

In step SP12, the control unit 20 extracts the landmarks LM of a rate corresponding to the display command for respective rates, and goes to next step SP13.

In step SP13, the control unit 20 displays the map screen GA in which the landmarks LM extracted according to the display command for respective rates are arranged on the LCD 24, and goes to next step SP14 to end the processing.

In this way, the control unit 20 of the PND 1 extracts the landmarks LM of a rate corresponding to the display command for respective rates, and arranges the landmarks LM on the map screen GA.

(8) Operation and Effect

In the above-described configuration, the control unit 20 of the PND 1 sets a user rate for arbitrary landmarks LM according to the user operation. Then, the control unit 20 extracts the landmarks LM of a user rate desired by the user from among the landmarks LM for which the user rate is set according to the user operation, and displays the map screen GA in which only thus extracted landmarks LM are arranged on the LCD 24.

In this way, the control unit 20 can surely extract only the landmarks LM of a rate desired by the user from among the landmarks LM (LM1, LM2, LM3, ... LM17) registered in the nonvolatile memory 21 and provide the user with the landmarks LM, which can prevent the map screen GA displayed on the LCD 24 from being complicated and make the user visually confirm the map screen GA easily.

According to the above-described configuration, the control unit 20 of the PND 1 sets a user rate for arbitrary landmarks LM according to the user operation, and, according to the user operation, extracts the landmarks LM of a user rate desired by the user from among the landmarks LM for which the user rate is set, and displays the map screen GA in which only thus extracted landmarks LM are arranged on the LCD 24. Accordingly, without complicating the map screen GA by arranging all the landmarks LM (LM1, LM2, LM3, ... LM17), only the landmarks LM of a user rate desired by the user can be extracted to be surely provided to the user. As a result, the map screen GA displayed on the LCD 24 can be visually confirmed easily by the user, which can improve the usability.

(9) Other Embodiments

In the above-described embodiment, the PND 1 arranges the landmarks LM according to the respective rates on the general map screen GA, to which the present invention is not restricted. There may be employed a configuration in which, at the time of executing the above-described navigation function, the accession route, arrival predicted time, etc. to the destination corresponding to the destination POI are calculated, and the landmarks LM according to the respective rates are arranged on the map screen GA including the accession route, arrival predicted time, etc.

Figure 14:
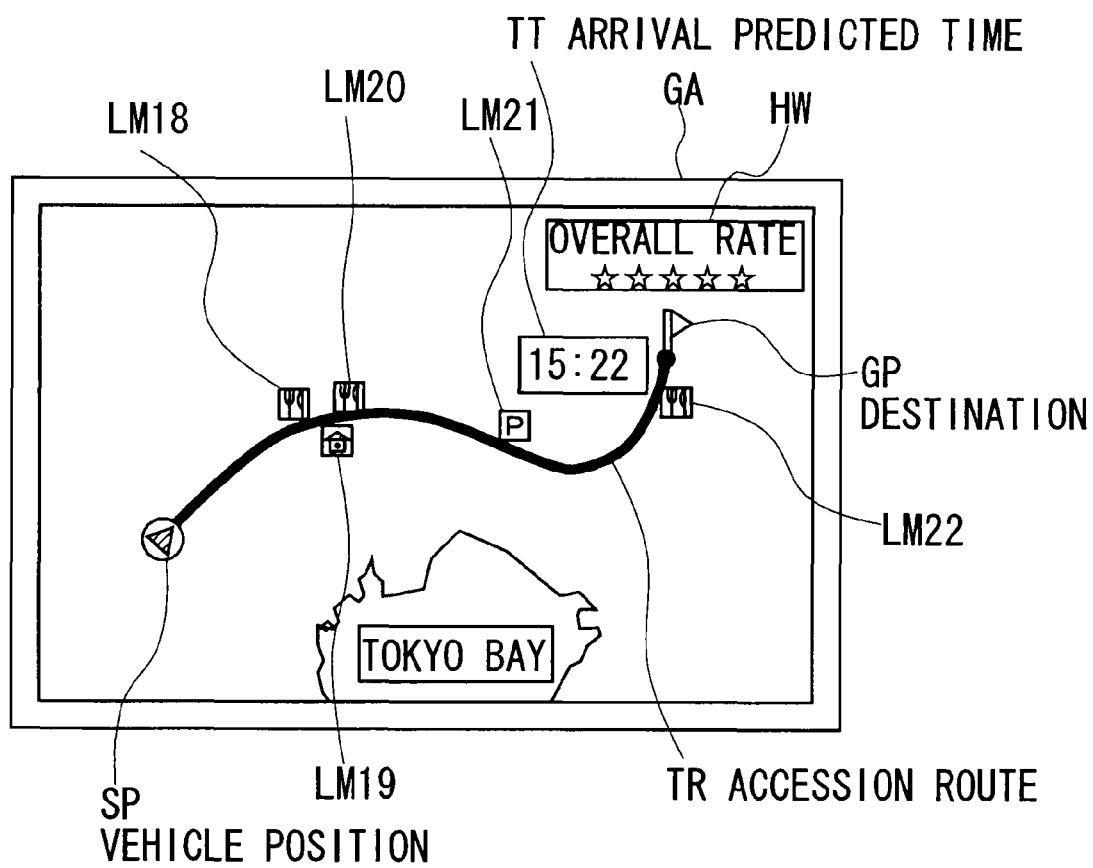
FIG. 14 shows a schematic view indicative of the state (1) of displaying a map screen in another embodiment.

Specifically, as shown in FIG. 14, when the PND 1 arranges the accession route TR from the vehicle position SP to the destination GP, and arrival predicted time TT on the map screen GA, for example, by the operation with respect to the touch panel 25 of the user who desires to know the landmarks LM whose overall rate near the accession route TR is high, when recognizing that a display command for respective rates to extract and display only the landmarks LM corresponding to the POI with user rate and POI with MMA rate whose overall rate is "5" is input, the landmarks LM (in this case, LM18, LM19, LM20, LM21, and LM22) which are near the accession route TR and whose overall rate is "5" are arranged on the map screen GA.

In this way, of the landmarks LM near the accession route TR from the vehicle position SP to the destination GP, only the landmarks LM (LM18, LM19, LM20, LM21, and LM22) whose overall rate is "5" can be selectively arranged on the map screen GA, which can make the user visually confirm the landmarks LM, and can improve the usability.

Figure 15:
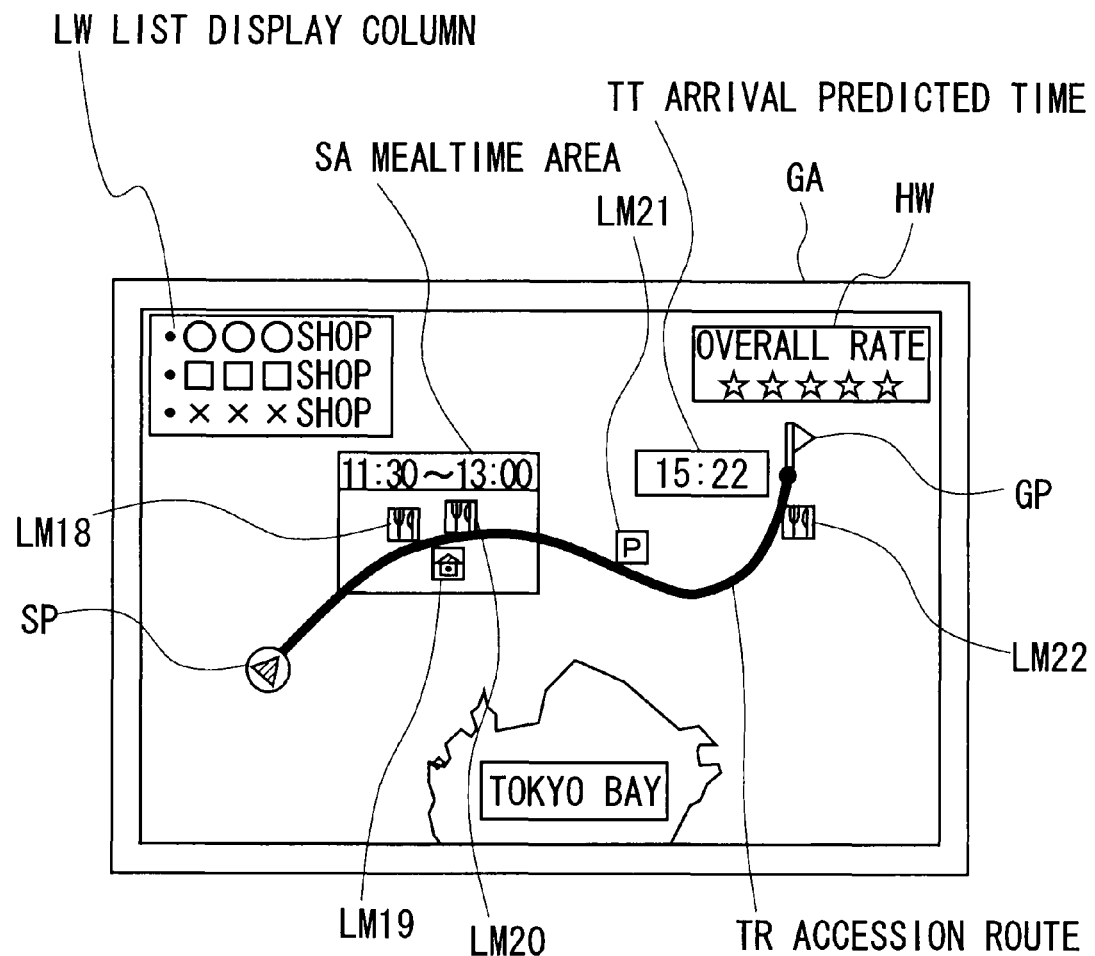
FIG. 15 shows a schematic view indicative of the state (2) of displaying a map screen in another embodiment.

Furthermore, in this case, during a time period from the current time to the arrival predicted time TT, for example, in case a preset mealtime such as a lunch time "11:30 to 13:00" or a dinner time "18:00 to 19:30" are included, as shown in FIG. 15, a mealtime area SA indicative of the mealtime may be so arranged as to overlap the accession route of the map screen GA. Then, the PND 1 may display the list of the landmark name LN (FIG. 6 and FIG. 8) of the landmarks LM (In this case, LM18, LM19, and LM20) in the mealtime area SA on a list display column LW on the upper-left of the map screen GA.

In this way, the PND 1 not only extracts the landmarks LM near the accession route TR from the vehicle position SP to the destination GP according to the rate and simply provides the user with the landmarks LM, but also further selects the landmarks LM which can be visited during the mealtime and provides the user with the landmarks LM in a comprehensible manner, which can improve the usability.

Furthermore, in this case, there may be employed a configuration in which, in addition to the mealtime, by setting the date spot time "17:00 to 18:30" convenient for dating and leisure time "13:00 to 17:00" convenient for seeing a movie and plying at an amusement park previously, the PND 1 further selects the landmarks LM which can be visited during the date spot time and leisure time and provides the user with thus selected landmarks LM.

In the above-described embodiment, as the respective items of the user rate information of the POI with user rate and MMA rate information of the POI having rate by mouth-to-mouth advertising, five rates or the overall rate, taste rate, price rate, service rate, and atmosphere rate are employed, to which the present invention is not restricted. The number of pieces and kind of respective items of the user rate position information and MMA rate information are not restricted, and they may be simply employed or a plurality of them may be arbitrarily combined to be employed. Specifically, for example, in case of the POI with user rate or POI with MMA rate corresponding to the resort facility such as an amusement park or a movie theater, as the respective items of the user rate information of the POI with user rate and MMA rate information of the POI with MMA rate, the PND 1 may separately employ items, or access rate indicative of the accessibility, auto park rate indicative of the presence and absence of an auto park and fee per unit hour, pleasantness rate indicative of the pleasantness.

Furthermore, in the above-described embodiment, the PND 1 digitizes respective items (overall rate, taste rate, price rate, service rate, and atmosphere rate) of the user rate position information and MMA rate position information using the five-stage evaluation, to which the present invention is not restricted. The stage of evaluation is not restricted, and stage of evaluation may be different for every item of the user rate position information and rate information by mouth-to-mouth advertising.

Furthermore, in the above-described embodiment, the PND 1 calculates the overall rate from the average value of the four rates or the taste rate, price rate, service rate, and atmosphere rate, to which the present invention is not restricted. Of the taste rate, price rate, service rate, and atmosphere rate, the overall rate may be calculated from the average value of them for which the rate is set by the user. Specifically, of the taste rate, price rate, service rate, and atmosphere rate, in case only the taste rate and price rate are set by the user, the overall rate may be calculated from the average value of only the taste rate and price rate, and then in case other rates are set, the overall rate may be recalculated including the rates.

Furthermore, in the above-described embodiment, the PND 1 extracts the landmarks LM according to the combined average rate configured by the average value of two rates or the taste rate and atmosphere rate, to which the present invention is not restricted. The kind and number of rates to calculate the combined average rate are not restricted.

Furthermore, in the above-described embodiment, the PND 1 displays the MMA rate information of POI with MMA rate in the MMA rate display frame K of the second landmark screen LG2, to which the present invention is not restricted. By the operation with respect to the touch panel 25 of the user, the MMA rate information of the MMA rate display frame K may be reset as user rate information to newly generate the POI with user rate.

Furthermore, in the above-described embodiment, the PND 1 generates the POI with user rate by generating and adding the user rate position information so that the user rate position information corresponds to the POI, to which the present invention is not restricted. The user rate position information may be filled into the POI, or the user rate position information may be set to a database to be managed so that the user rate position information corresponds to the POI. Furthermore, in this case, the PND 1 may correct the user rate position information of the once generated POI with user rate to update the POI with user rate.

Furthermore, in the above-described embodiment, the PND 1 sets the priority of the POI with user rate higher than that of the POI with MMA rate, to which the present invention is not restricted. The priority of the POI with MMA rate may be set higher than that of the POI with user rate, or, by overmatching the time stored in the nonvolatile memory 21, a priority may be given to the POI with MMA rate or POI with user rate which is stored (updated) recently in time series.

Furthermore, in this case, the PND 1 may arrange only the landmarks LM corresponding to the POI with user rate on the map screen GA, or may arrange only the landmarks LM corresponding to the POI with MMA rate on the map screen GA, and the method of arranging the landmarks LM on the map screen GA can be arbitrarily selected by the user.

Furthermore, in the above-described embodiment, the PND 1 obtains the POI with MMA rate which is generated by adding the MMA rate to the POI from the delivery server 13, to which the present invention is not restricted. The Rich Site Summary (RSS) in which the MMA rate corresponding to the POI is described in the Extensible Markup Language (XML) format may be obtained from the delivery server 13. Furthermore, in this case, when the personal computer 12 obtains rate by mouth-to-mouth advertising included in the RSS which is obtained from other sites by mouth-to-mouth advertising etc., the PND 1 can newly add a new POI which is unable to be obtained by only the delivery from the delivery server 13 and an MMA rate related to the POI.

Furthermore, in the above-described embodiment, for the PND 1, the nonvolatile memory 21 is employed to store the map data or POI, to which the present invention is not restricted. A hard disc drive or an optical disc may be used.

Furthermore, in the above-described embodiment, when the PND 1 is connected to the personal computer 12 through a USB cable, transferring the POI with user rate and POI with MMA rate is executed between the PND 1 and the delivery server 13, to which the present invention is not restricted. The PND 1 and personal computer 12 may be connected through a wireless LAN (Local Area Network) or a wired LAN, Bluetooth (registered trademark of The Bluetooth SIG Inc.). Furthermore, in this case, the PND 1 may directly obtain the POI with user rate and POI with MMA rate from the delivery server 13, not through the personal computer 12, and any method may be employed in transferring the POI with user rate and POI with MMA rate between the PND 1 and the delivery server 13.

When using a wireless LAN or Bluetooth (registered trademark of The Bluetooth SIG Inc.), the PND 1 may be directly connected to an access point of a parking area, etc. In this way, a new POI with MMA rate can be obtained at an outside location, which can further improve the usability of the PND 1.

Furthermore, in the above-described embodiment, the POI is employed as position information, to which the present invention is not restricted. Latitude and longitude information or address, etc., in the form of a text may be employed.

Furthermore, in above-described embodiment, as a navigation device, the portable type PND 1 (PND) shown in FIGS. 2 to 15 is employed, to which the present invention is not restricted. The present invention may be applied to a stationary vehicle NV device, a portable game device, a cellular phone, etc.

Furthermore, in the above-described embodiment, as an evaluation setting unit that generates position information having first evaluation value by setting an evaluation value selected by a user so that the evaluation value corresponds to position information, the control unit 20 shown in FIG. 2 to FIG. 15 is employed, to which the present invention is not restricted. By setting an evaluation value selected by the user so that the evaluation value corresponds to position information, such as an evaluation setting circuit, etc., of hardware configuration that generates the position information having the first evaluation value, other various evaluation setting unit may be employed.

Furthermore, in the above-described embodiment, as a position information extraction unit that extracts, of the position information having the first evaluation value, the position information having the first evaluation value corresponding to the evaluation value desired by the user, the control unit 20 shown in FIGS. 2 to 15 is employed, to which the present invention is not restricted. Such as a position information extraction circuit of hardware configuration that extracts, of the position information having the first evaluation value, the position information having the first evaluation value corresponding to the evaluation value desired by the user, other various position information extraction units may be employed.

Furthermore, in the above-described embodiment, as a display control unit that displays a position information screen having evaluation value on which the position information having the first evaluation value extracted by the position information extraction unit is reflected on a display unit, the control unit 20 shown in FIGS. 2 to 15 is employed, to which the present invention is not restricted. Such as a display control circuit and a control circuit having a display unit united thereto of hardware configuration which displays a position information screen having evaluation value on which the position information having the first evaluation value extracted by the position information extraction unit is reflected on a display unit, other various display control units may be employed.

Furthermore, in the above-described embodiment, as a display means, the LCD 24 of the monitor 2 shown in FIGS. 2 to 15 is employed, to which the present invention is not restricted. A cathode-ray tube display and a plasma display may be employed.

Furthermore, in the above-described embodiment, the PND 1 activates a processing program stored in the nonvolatile memory 21 to realize the general navigation function, rate setting function, display function for respective rates, to which the present invention is not restricted. In accordance with a processing program installed from a recording medium, or a processing program downloaded from the Internet, the general navigation function, rate setting function, display function for respective rates may be realized.

The navigation device and evaluation value setting method according to the embodiments of the present invention can be employed for the application to set the rate for the POI of PND to be mounted on a vehicle.

It should be understood by those skilled in the art that various modifications, combinations, sub-combinations and alterations may occur depending on design requirements and other factors insofar as they are within the scope of the appended claims or the equivalents thereof.

What is claimed is:

1. A navigation device comprising:
an evaluation setting unit that generates position information having a first evaluation value by setting an evaluation value selected by a user so that the first evaluation value corresponds to the position information;
a position information extraction unit that extracts, from the position information having the first evaluation value, the position information having the first evaluation value corresponding to a desired evaluation value desired by the user; and
a display control unit that displays a position information screen having an evaluation value on which the position information having the first evaluation value extracted by the position information extraction unit is reflected on a display unit.

2. The navigation device according to claim 1, wherein
the evaluation setting unit generates the position information having the first evaluation value by setting an itemized evaluation value with respect to a plurality of respective items preset in the position information, and
the position information extraction unit extracts, from the position information having the first evaluation value, the position information having the first evaluation value corresponding to an itemized evaluation value desired by the user.

3. The navigation device according to claim 2, wherein
the position information extraction unit extracts, from the position information having the first evaluation value, the position information having the first evaluation value corresponding to the plural itemized evaluation values desired by the user.

4. The navigation device according to claim 2, further comprising:
an overall evaluation calculation unit that calculates an overall evaluation value of the position information having the first evaluation value according to the plural itemized evaluation values set for the position information having the first evaluation value by the evaluation setting unit, wherein
the position information extraction unit extracts, from the position information having the first evaluation value for which the overall evaluation value is calculated by the overall evaluation calculation unit, the position information having the first evaluation value corresponding to the overall evaluation value desired by the user.

5. The navigation device according to claim 1, further comprising:
an obtaining unit that obtains position information having a second evaluation value for which an average value of the evaluation values selected by a plurality of users is set from an outside server, wherein
the position information extraction unit extracts, from the position information having the second evaluation value, the position information having a second evaluation value of the desired evaluation value desired by the user.

6. The navigation device according to claim 5, wherein the position information having the second evaluation value is described in the Rich Site Summary (RSS) in the Extensible Markup Language (XML) format.

7. The navigation device according to claim 1, further comprising:
an accession route calculation unit that calculates an accession route to a destination, wherein
the position information extraction unit extracts, from the position information having the first evaluation value, the position information having the first evaluation value which is the evaluation value desired by the user, and is located near the accession route.

8. The evaluation device according to claim 1, wherein
the evaluation setting unit associates, with the position information having the first evaluation value, a second evaluation value obtained from an outside server via a network,
the position information extraction unit extracts, from the position information having the first and second evaluation values, a location of a facility corresponding to the position information having one of the first evaluation value and the second evaluation value matching the desired evaluation value, and
the display control unit displays the location of the facility extracted by the position information extraction unit within the position information screen.

9. The evaluation device according to claim 1, further comprising:
a storage unit that stores the position information having the first evaluation value in association with a second evaluation value obtained from an outside server via a network.

10. The evaluation device according to claim 9, wherein the position information extraction unit extracts the position information having the first evaluation value and the second evaluation stored in the storage unit based on the first evaluation value corresponding to the desired evaluation value.

11. The evaluation device according to claim 1, wherein
the evaluation setting unit associates, with the position information having the first evaluation value, a second evaluation value obtained from an outside server via a network,
the position information extraction unit extracts, from the position information having the first and second evaluation values, a location of a facility corresponding to the position information having one of the first evaluation value and the second evaluation value matching or exceeding the desired evaluation value and
the display control unit displays the location of the facility extracted by the position information extraction unit within the position information screen.

12. The evaluation device according to claim 1, wherein
the evaluation setting unit generates the position information having the first evaluation value by further setting a first itemized evaluation value selected by the user with respect to a plurality of predetermined characteristics of the position information,
the evaluation setting unit associates, with the position information having the first evaluation value, a second evaluation value that includes a second itemized evaluation value with respect to the plurality of predetermined characteristics of the position information obtained from an outside server via a network,
the position information extraction unit extracts, from the position information having the first and second evaluation values, a location of a facility corresponding to the position information having one of the first evaluation value that includes the first itemized evaluation value and the second evaluation value that includes the second itemized evaluation value matching or exceeding a desired itemized evaluation value, and
the display control unit displays the location of the facility extracted by the position information extraction unit within the position information screen.

13. An evaluation value setting method, implemented at an evaluation value device, comprising:
an evaluation setting step of generating position information having a first evaluation value by setting an evaluation value selected by a user so that the first evaluation value corresponds to the position information using an evaluation setting unit;
a position information extraction step of extracting, from the position information having the first evaluation value, the position information having the first evaluation value corresponding to a desired evaluation value desired by the user using a position information extraction unit; and
a display control step of displaying a position information screen having an evaluation value on which the position information having the first evaluation value extracted by the position information extraction unit is reflected on a display unit using a display control unit.

14. The evaluation value setting method according to claim 13, wherein
the evaluation setting step generates the position information having the first evaluation value by setting an itemized evaluation value with respect to a plurality of respective items preset in the position information, and the position information extraction step extracts, from the position information having the first evaluation value, the position information having the first evaluation value corresponding to an itemized evaluation value desired by the user.

15. The evaluation value setting method according to claim 14, wherein the position information extraction step extracts, from the position information having the first evaluation value, the position information having the first evaluation value corresponding to plural itemized evaluation values desired by the user.

16. The evaluation value setting method according to claim 14, further comprising:
  an overall evaluation calculation step of calculating the overall evaluation value of the position information having the first evaluation value according to plural itemized evaluation values set for the position information having the first evaluation value in the evaluation setting step, wherein
  the position information extraction step extracts, from the position information having the first evaluation value for which the overall evaluation value is calculated in the overall evaluation calculation step, the position information having the first evaluation value corresponding to an overall evaluation value desired by the user.

17. The evaluation value setting method according to claim 13, further comprising:
  an obtaining step of obtaining position information having second evaluation value for which an average value of the evaluation values selected by a plurality of users is set from an outside server, wherein
  the position information extraction step extracts, from the position information having the second evaluation value, the position information having the second evaluation value of the desired evaluation value desired by the user.

18. The evaluation value setting method according to claim 17, wherein the position information having the second evaluation value is described in the Rich Site Summary (RSS) in the Extensible Markup Language (XML) format.

19. The evaluation value setting method according to claim 13, further comprising:
  an accession route calculation step of calculating an accession route to a destination, wherein
  the position information extraction step extracts, from the position information having the first evaluation value, the position information having the first evaluation value which is the desired evaluation value desired by the user, and is located near the accession route.

* * * * *